United States Patent

Wuest

[11] Patent Number: 5,769,546
[45] Date of Patent: Jun. 23, 1998

[54] CRANKSHAFT BEARING FOR AN INTERNAL COMBUSTION ENGINE

[75] Inventor: Johannes Wuest, Weissach-Flacht, Germany

[73] Assignee: Dr. Ing. h.c.F. Porsche AG, Weissach, Germany

[21] Appl. No.: 726,420

[22] Filed: Oct. 7, 1996

[30] Foreign Application Priority Data

Oct. 6, 1995 [DE] Germany .......................... 195 37 191.7

[51] Int. Cl.⁶ ........................................... F16C 33/06
[52] U.S. Cl. ............................................ 384/273; 384/294
[58] Field of Search .................................. 384/294, 273, 384/288, 295, 296, 457

[56] References Cited

U.S. PATENT DOCUMENTS 4,693,216  9/1987  Ampferer et al. .

FOREIGN PATENT DOCUMENTS 34 26 208  3/1980  Germany .

*Primary Examiner*—Lenard A. Footland
*Attorney, Agent, or Firm*—Evenson, McKeown, Edwards & Lenahan, P.L.L.C.

[57] ABSTRACT

The crankshaft bearing for an internal combustion engine consists of two bearing sections bolted together, in which an insert made of a ferrometallic material is embedded in a casting made of a light metal alloy. The inserts consist of shaped molded parts with openings and thickenings as well as a semicircular carrier that receives the respective part of the bearing bore. The inserts are traversed by the bearing bolts, which on one side abut the outer bolt surfaces on the casting of one bearing section and are bolted into the casting of the other bearing section.

38 Claims, 4 Drawing Sheets

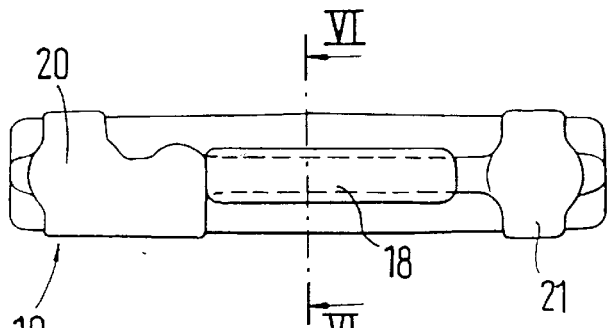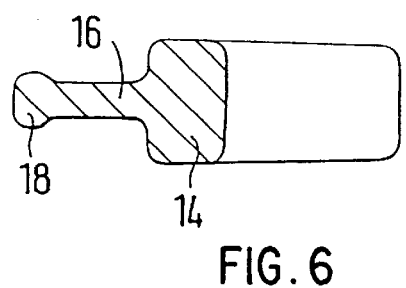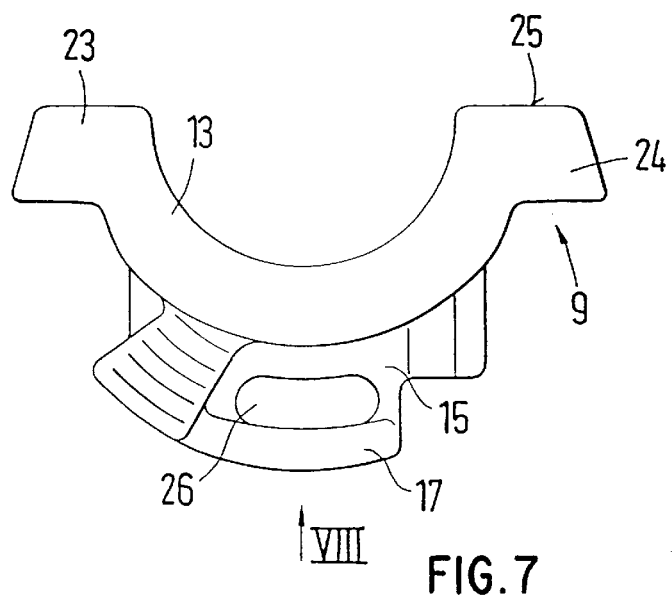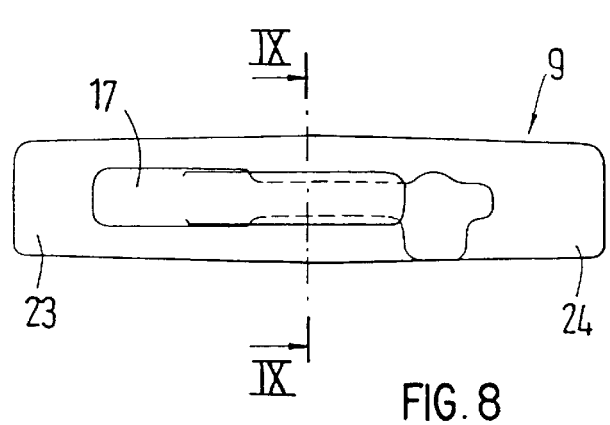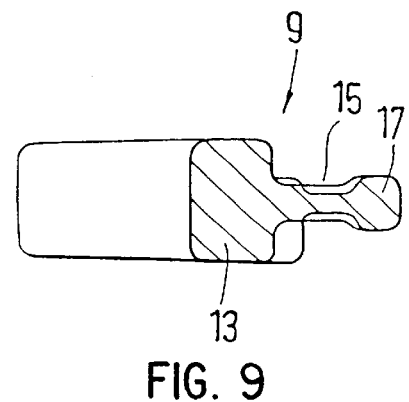

CRANKSHAFT BEARING FOR AN INTERNAL COMBUSTION ENGINE

BACKGROUND AND SUMMARY OF THE INVENTION

The invention relates to a crankshaft bearing for an internal combustion engine and, more particularly, to a crankshaft bearing for an internal combustion engine with two bearing sections cast from a light metal alloy and connected together by bearing bolts. Each bearing section receives an insert made of a ferrometallic material. The inserts abut one another and each have a part of bearing bore formed in it.

A crankshaft bearing of the above-mentioned type for an internal combustion engine is known, for example, from German patent document DE 34 26 208 C1 (corresponding to U.S. Pat. No. 4,693,216). The crankshaft bearing described therein consists of a crankcase and a bearing cap. The crankcase and bearing cap consist of a light metal or a light-metal alloy, with a ferrometallic core being integrated at least into the bearing cap. This core is embedded in the light metal or light metal alloy in a casting process when the bearing cap is manufactured. The bearing cap can also be part of a bracket reinforcing the crankcase, that includes several bearing caps and is likewise made of light metal or a light metal alloy, especially by casting. The ferrometallic core in the bearing cap has two bushings that receive the bearing bolts between which a cross part extends, in which one half of the bearing bore for a crankshaft pin is formed. The bearing bolt connection thus rests directly on the bushings of the ferrometallic core.

The goal of the invention is to improve a crankshaft bearing according to the above-species in such fashion that a high strength connection between the ferromagnetic core, i.e. the insert, and the light metal alloy receiving the insert (casting) is ensured, while a high rigidity of the entire crankshaft bearing, with a low weight, is guaranteed. Moreover, uniform expansion of the bearing bore in all directions and under all operating conditions is ensured.

This goal is achieved according to the invention by a crankshaft bearing for an internal combustion engine with two bearing sections cast from a light metal alloy and connected together by bearing bolts. Each bearing section receives an insert made of a ferrometallic material. The inserts abut one another and each have a part of a bearing bore formed in it. The inserts consist of shaped parts with openings and thickenings. The inserts have a semicircular carrier that surrounds the respective part of the bearing bore. The inserts are traversed by bearing bolts. The bearing bolts abut an outer bolt surface of the bearing section on one side, and are bolted into the opposite bearing section on the other side.

By designing the inserts as shaped, molded parts with openings and thickenings, a high-strength connection with a surrounding casting (light metal alloy) of the crankshaft bearing or the respective bearing sections is ensured. The design of a semicircular support surrounding part of the bearing bore ensures uniform expansion behavior and guarantees a high degree of bearing roundness under all operating conditions. High rigidity of the overall connection with simultaneous low weight is achieved if the inserts are traversed by the bearing bolts and these bolts firstly abut an outer bolt surface of the bearing section (casting) arid, secondly, are bolted into the opposite bearing section. The inserts then have their ends abutting one another, so that they are tensioned directly against one another in the bolted state. In this way, the operating forces can be accepted advantageously and transmitted.

The high strength of the connection between the insert and the surrounding light metal alloy and the shape of the inserts ensures safe transmission of the operating forces into the crankcase, although there is no inner connection between the ferrometallic material of the insert and the light metal alloy in which it is embedded. In particular, the design of the semicircular carrier and the additional shaping of the insert ensures that the gaps between the ferrometallic insert and the surrounding light metal alloy are subjected almost exclusively to pressure loads.

A high degree of bearing roundness and uniform expansion of the bearing bore or insert are ensured when the insert has at least partially an approximately T-shaped cross section, with the semicircular carrier forming the cross piece. By carefully adjusting the cross sections and weights of the insert, it is possible to ensure that uniform radial expansion takes place under all operating conditions and temperatures.

The strength of the connection between the ferrometallic insert and the light metal alloy receiving the insert is additionally improved to a significant degree if the inserts have a thickened portion that runs at a distance from the carrier.

Another improved meshing effect of the structural elements is achieved when at least some of the openings in the insert are located between the carrier and the thickened section.

High rigidity of the entire crankshaft bearing is achieved when the bearing bolts pass through the insert in a base-shaped portion that extends outward from the carrier in the direction of the bearing bolts.

The connection between the insert and the light metal alloy can be further advantageously improved if the insert is provided with a toothed profile on at least two opposite outer sides.

The base-shaped sections that are traversed by the bearing bolts advantageously have faces that extend perpendicularly with respect to the bolting direction, in order to ensure directed guidance of the bolting forces and to prevent shifting forces between the two structural elements.

The insert consists of a ferromagnetic material, cast iron for example, forged steel, or sintered steel. The insert is placed in a crucible in the unmachined state and cast with a light metal or light metal alloy around it. The insert is not surrounded by the casting in all areas after its final processing, and in particular, the semicircular carriers are exposed at their ends.

Further advantages and advantageous improvements on the invention will be ever t from the specification. One embodiment of the invention is described in greater detail in the following description and drawings.

Other objects, advantages and novel features of the present invention will become apparent from the following detailed description of the invention when considered in conjunction with the accompanying drawings.

BRIEF DESCRIPTION OF THE DRAWINGS

FIG. 5 is a top view of the insert looking in the direction of arrow V in FIG. 4;

FIG. 6 is a cross section through the insert along line VI—VI according to FIG. 5;

FIG. 7 is a view of the second insert;

FIG. 8 is a top view of the second insert looking in the direction of arrow VIII in FIG. 7;

FIG. 9 is a cross section through the second insert along line IX—IX in FIG. 8;

DETAILED DESCRIPTION OF THE DRAWINGS

Figure 1:
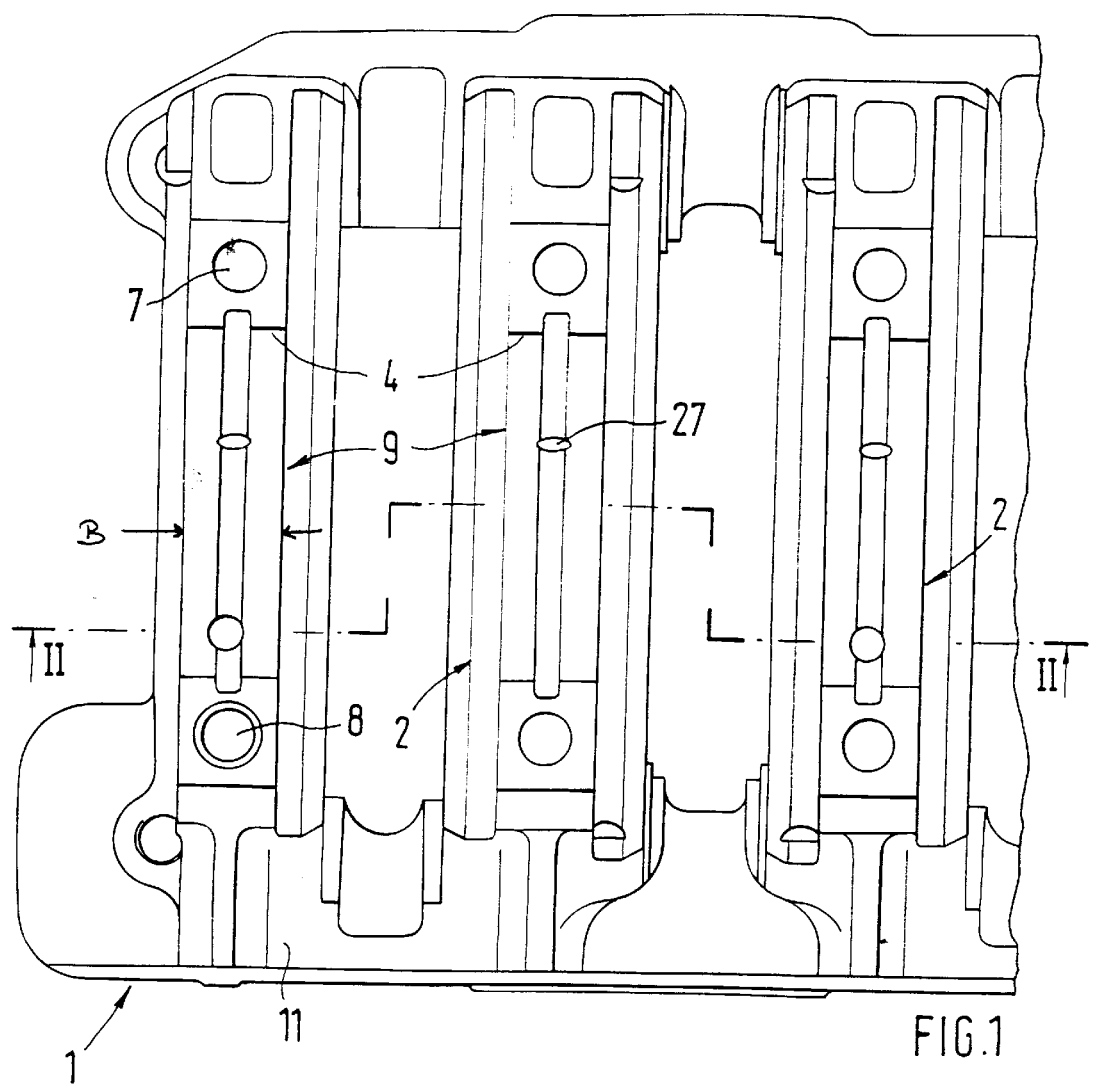
FIG. 1 shows a partial top view of one half of a bearing frame with a plurality of bearing sections.
Figure 2:
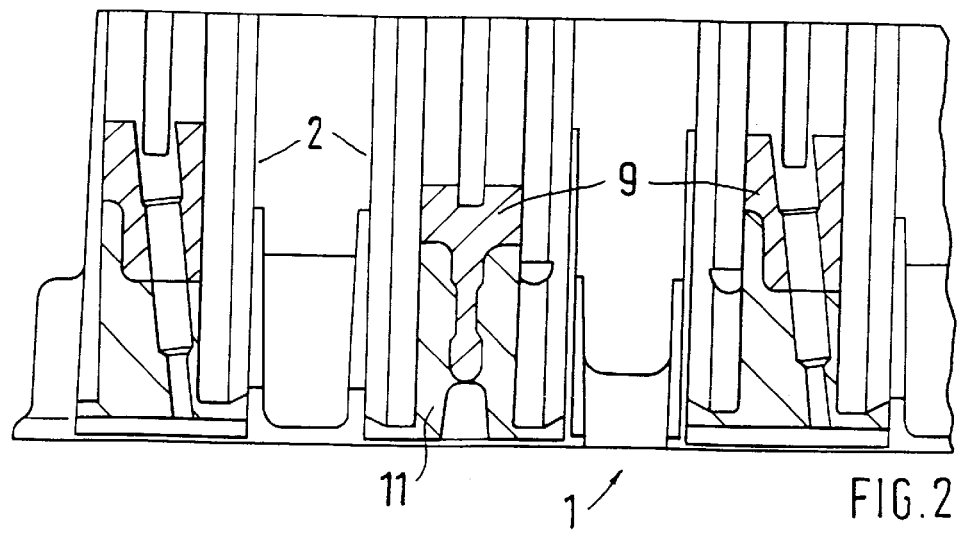
FIG. 2 is a lengthwise section view through the bearing frame taken along line II—II in FIG. 1.
Figure 3:
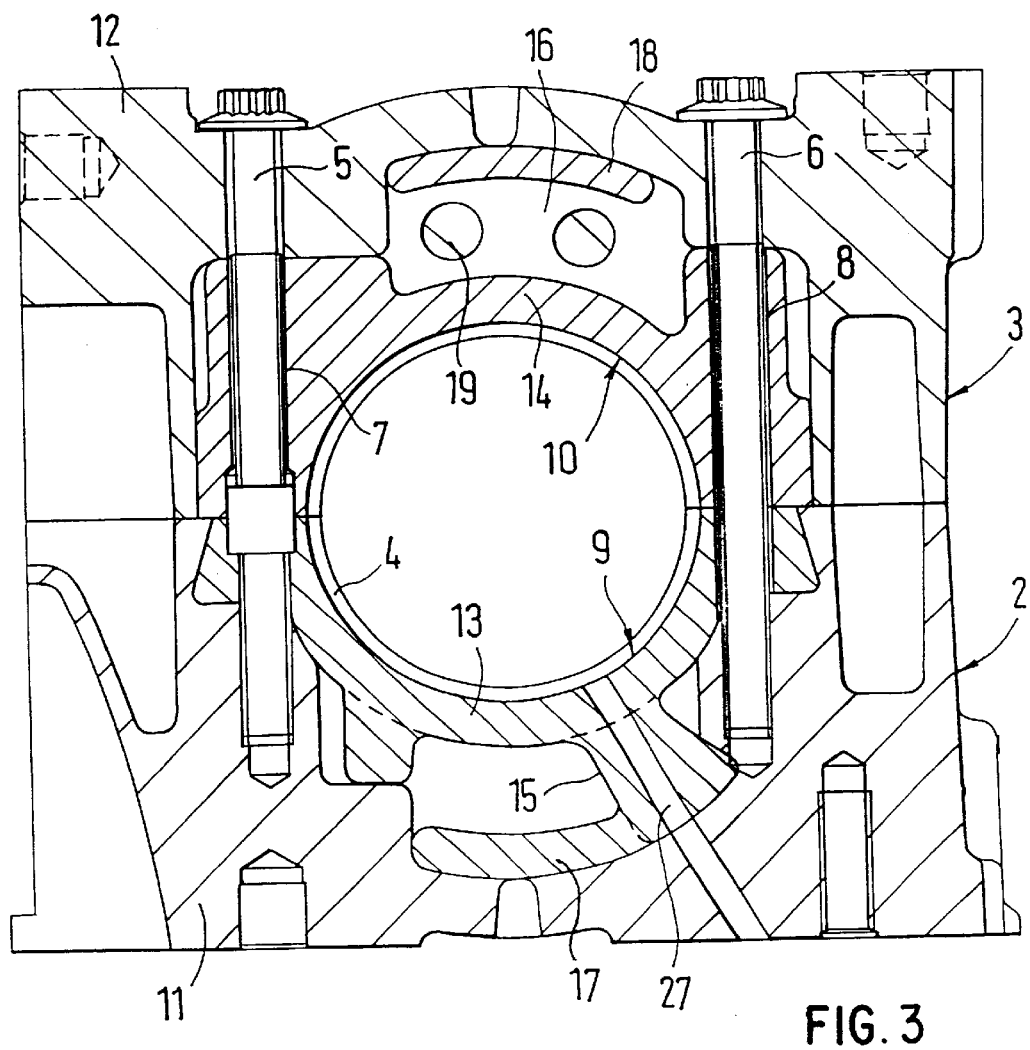
FIG. 3 is a cross-section through two bearing sections joined with one another and forming a bearing location.
Figure 4:
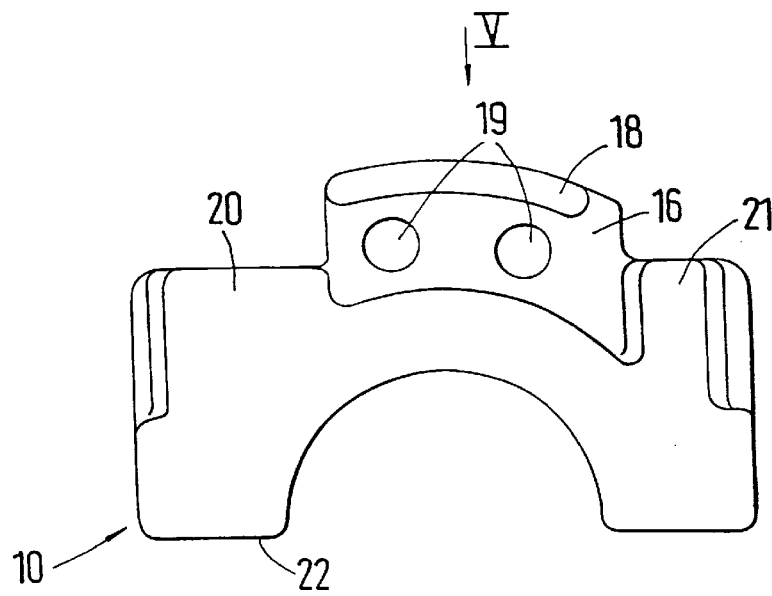
FIG. 4 is a view of an insert.

The crankshaft bearing shown in the embodiment described herein, but without being limited to this embodiment only, consists of two bearing brackets joined to one another with a plurality of bearing sections that are inserted into the crankcase of an internal combustion engine. Each bearing bracket 1 consists of a plurality of bearing sections 2, 3 arranged sequentially, into each of which one half of a bearing bore 4 is formed. In the assembled state, each bearing bore 4 accepts a crank pin of the crankshaft (not shown). The connection of bearing sections 2, 3 and hence the two bearing brackets is effected by bearing bolts 5, 6 located in bores 7,8. Each bearing section 2, 3 comprises an integrated insert 9, 10 made of a ferrometallic material, embedded in a casting part 11, 12 made of a light metal alloy, which forms the respective bearing section and the respective bearing bracket 1.

Inserts 9, 10 each consist of a semicircular carrier 13, 14 in which the respective part of the bearing bore 4 is formed. From these carriers 13, 14, a rib 15, 16 of reduced thickness extends radially outward. The rib has a thickened portion 17, 18 at its radially outer end.

Rib 16 in this embodiment has two openings 19 which are filled after casting with light metal alloy. Insert 10 also has two base-shaped sections 20, 21 extending from carrier 14. Between the two bore-shaped sections 20, 21, a bearing bore 4 is located. The base-shaped section 20, 21 serve to receive bearing bolts 5, 6 or to allow them to pass through the sections. These base-shaped sections 20, 21 extend up to the face 22 of the insert 10.

Insert 9 has two projections 23, 24 extending radially from carrier 13. The projections 23, 24 are traversed by the bearing bolts 5, 6 and extend in the vicinity of face 25. These projections 23, 24 make it possible to produce beveled lateral surfaces that result in an improved connection or meshing with the casting. An opening 26 made in the form of an elongated hole is formed in rib 15. Insert 9 is also provided with an oil hole 27. The oil hole 27 extends radially and terminates at one end in the circumferential surface of the bearing bore 4 and, at the opposite end area, continues in casting 11 of the bearing section. This oil hole 27 serves to supply the bearing with lubricant.

Bearing bolts 5, 6 are arranged so that a bearing section 3 is completely traversed, with bolt heads 28, 29 abutting an outer bolt surface 30, 31 of casting 12 of this bearing section 3. The bearing bolts 5, 6 thus traverse the insert 10 in the vicinity of the base-shaped sections 20, 21 and extensions 23, 24 of insert 9 and are bolted in a blind hole bore 33, 34, forming the end of the bearing bore, in casting 11 of the opposite bearing section 2.

Following the final machining of the surfaces, the bearing sections are designed so that the ends of the semicircular carriers are exposed, in other words, the width b of the semicircular carriers corresponds to the bearing width B of the respective bearing sections. The ribs abutting the semicircular carriers have a limited width and make a transition to the thickened sections with a width d. The ribs and the thickened sections are each arranged approximately centrally relative to bearing width B and are embedded completely in the casting.

Figure 10:
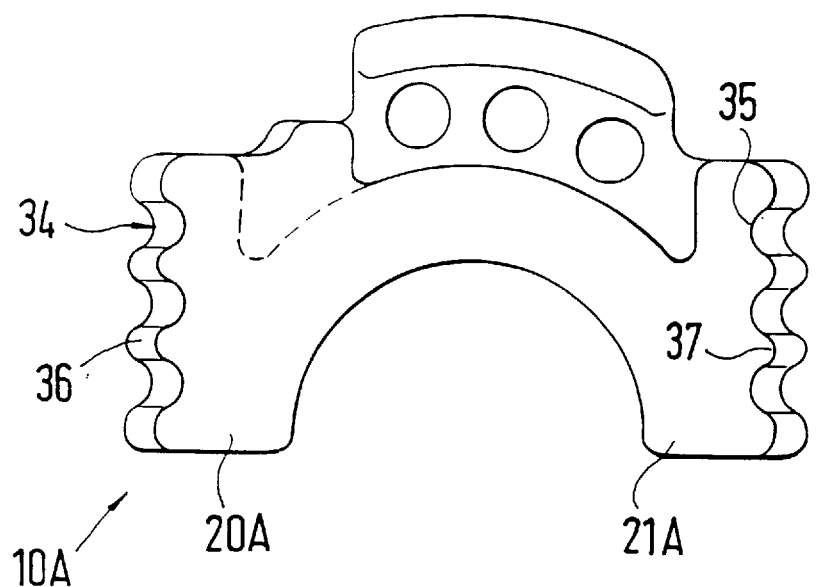
FIG. 10 is a view of a variation on the first insert.
Figure 11:
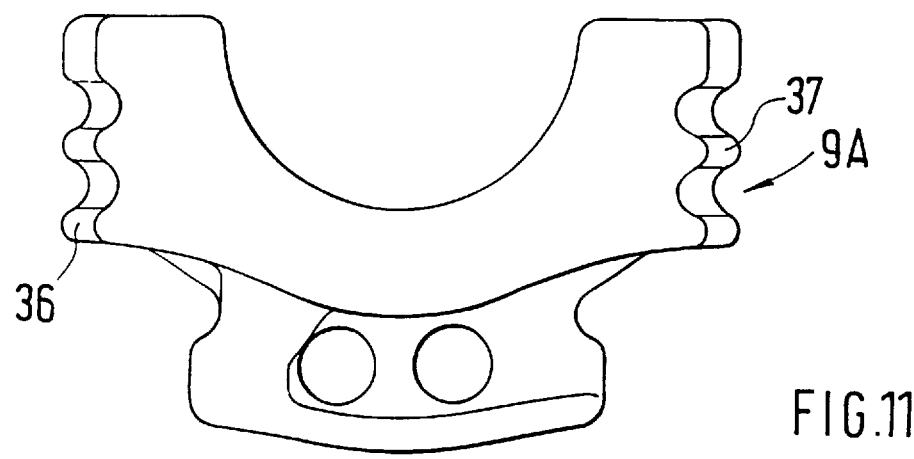
FIG. 11 is a view of a modification of the second insertion point.

In the modifications marked 9A and 10A (FIGS. 10 and 11) in the inserts described above, the base-shaped sections 20A, 21A are provided with a toothed profile 36, 37 on their exteriors 34, 35. This toothed profile 36, 37 is made wave-shaped in the embodiment shown, but another shape, such as a sawtooth profile or a rectangular toothing, is readily possible. Inserts 9A and 10A also differ in the number and arrangement of the openings. Other modifications are possible.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A crankshaft bearing for an internal combustion engine having two bearing sections cast from a light metal alloy and connected together via bearing bolts, each of said two bearing sections receiving an insert made of a ferromagnetic material, each insert abutting another and having a part of a bearing bore formed therein, wherein said inserts are shaped parts having openings and thickened sections, said inserts having a semicircular carrier which surrounds a respective part of the bearing bore;

wherein said inserts are traversed by the bearing bolts, said bearing bolts abutting an outer bolt surface of one of said bearing sections on one side, and are bolted into an opposite one of said bearing sections on the other side.

2. The crankshaft bearing according to claim 1, wherein said inserts at least partially have an approximately T-shaped cross section, said semicircular carrier forming a cross member of said T-shaped cross section.

3. The crankshaft bearing according to claim 2, wherein said bearing bolts are received in blind holes in a casting forming a bearing section, said blind holes being arranged as extensions of holes formed in one of said inserts for said bearing bolts.

4. The crankshaft bearing according to claim 2, wherein said two bearing sections are combined to form ladder-shaped bearing brackets.

5. The crankshaft bearing according to claim 2, wherein a width of said semicircular carrier at least approximately corresponds to a bearing width of respective bearing sections.

6. The crankshaft bearing according to claim 2, wherein a width of said thickened sections is less than a bearing width of respective bearing sections, and wherein said thickened sections are embedded approximately centrally relative to said bearing width in the respective bearing section.

7. The crankshaft bearing according to claim 2, wherein said inserts are provided with a toothed profile at opposite outer sides thereof.

8. The crankshaft bearing according to claim 2, wherein projections are formed on at least one of said inserts, said projections extending from said semicircular carrier parallel to an end of said insert, said projections being traversed by said bearing bolts.

9. The crankshaft bearing according to claim 2, wherein one of said inserts has a base-shaped section which receives one of said bearing bolts, said base-shaped section extending from said semicircular carrier in a direction of a bearing bolt connection.

10. The crankshaft bearing according to claim 2, wherein said thickened sections extend at a distance from said semicircular carrier.

11. The crankshaft bearing according to claim 10, wherein at least some of said openings are arranged between said semicircular carrier and said thickened section.

12. The crankshaft bearing according to claim 1, wherein said thickened sections extend at a distance from said semicircular carrier.

13. The crankshaft bearing according to claim 12, wherein projections are formed on at least one of said inserts, said projections extending from said semicircular carrier parallel to an end of said insert, said projections being traversed by said bearing bolts.

14. The crankshaft bearing according to claim 12, wherein said inserts are provided with a toothed profile at opposite outer sides thereof.

15. The crankshaft bearing according to claim 12, wherein said bearing bolts are received in blind holes in a casting forming a bearing section, said blind holes being arranged as extensions of holes formed in one of said inserts for said bearing bolts.

16. The crankshaft bearing according to claim 12, wherein said two bearing sections are combined to form ladder-shaped bearing brackets.

17. The crankshaft bearing according to claim 12, wherein a width of said semicircular carrier at least approximately corresponds to a bearing width of respective bearing sections.

18. The crankshaft bearing according to claim 12, wherein a width of said thickened sections is less than a bearing width of respective bearing sections, and wherein said thickened sections are embedded approximately centrally relative to said bearing width in the respective bearing section.

19. The crankshaft bearing according to claim 12, wherein at least some of said openings are arranged between said semicircular carrier and said thickened section.

20. The crankshaft bearing according to claim 19, wherein one of said inserts has a base-shaped section which receives one of said bearing bolts, said base-shaped section extending from said semicircular carrier in a direction of a bearing bolt connection.

21. The crankshaft bearing according to claim 19, wherein projections are formed on at least one of said inserts, said projections extending from said semicircular carrier parallel to an end of said insert, said projections being traversed by said bearing bolts.

22. The crankshaft bearing according to claim 19, wherein said inserts are provided with a toothed profile at opposite outer sides thereof.

23. The crankshaft bearing according to claim 19, wherein said bearing bolts are received in blind holes in a casting forming a bearing section, said blind holes being arranged as extensions of holes formed in one of said inserts for said bearing bolts.

24. The crankshaft bearing according to claim 19, wherein said two bearing sections are combined to form ladder-shaped bearing brackets.

25. The crankshaft bearing according to claim 19, wherein a width of said semicircular carrier at least approximately corresponds to a bearing width of respective bearing sections.

26. The crankshaft bearing according to claim 19, wherein a width of said thickened sections is less than a bearing width of respective bearing sections, and wherein said thickened sections are embedded approximately centrally relative to said bearing width in the respective bearing section.

27. The crankshaft bearing according to claim 12, wherein one of said inserts has a base-shaped section which receives one of said bearing bolts, said base-shaped section extending from said semicircular carrier in a direction of a bearing bolt connection.

28. The crankshaft bearing according to claim 1, wherein one of said inserts has a base-shaped section which receives one of said bearing bolts, said base-shaped section extending from said semicircular carrier in a direction of a bearing bolt connection.

29. The crankshaft bearing according to claim 28, wherein one of said inserts has at least two base-shaped sections, said openings being provided between said two base-shaped sections.

30. The crankshaft bearing according to claim 28, wherein projections are formed on at least one of said inserts, said projections extending from said semicircular carrier parallel to an end of said insert, said projections being traversed by said bearing bolts.

31. The crankshaft bearing according to claim 1, wherein one of said inserts has at least two base-shaped sections, said openings being provided between said two base-shaped sections.

32. The crankshaft bearing according to claim 31, wherein projections are formed on at least one of said inserts, said projections extending from said semicircular carrier parallel to an end of said insert, said projections being traversed by said bearing bolts.

33. The crankshaft bearing according to claim 1, wherein projections are formed on at least one of said inserts, said projections extending from said semicircular carrier parallel to an end of said insert, said projections being traversed by said bearing bolts.

34. The crankshaft bearing according to claim 1, wherein said inserts are provided with a toothed profile at opposite outer sides thereof.

35. The crankshaft bearing according to claim 1, wherein a width of said thickened sections is less than a bearing width of respective bearing sections, and wherein said thickened sections are embedded approximately centrally relative to said bearing width in the respective bearing section.

36. The crankshaft bearing according to claim 1, wherein said bearing bolts are received in blind holes in a casting forming a bearing section, said blind holes being arranged as extensions of holes formed in one of said inserts for said bearing bolts.

37. The crankshaft bearing according to claim 1, wherein said two bearing sections are combined to form ladder-shaped bearing brackets.

38. The crankshaft bearing according to claim 1, wherein a width of said semicircular carrier at least approximately corresponds to a bearing width of respective bearing sections.

* * * * *